United States Patent
Lin et al.

(10) Patent No.: US 7,787,090 B2
(45) Date of Patent: Aug. 31, 2010

(54) IN PLANE SWITCHING LCD AND FRINGE FIELD SWITCHING LCD

(75) Inventors: Yu-Cheng Lin, Miao-Li (TW); Chueh-Ju Chen, Miao-Li (TW); Yu-Ching Kang, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 510 days.

(21) Appl. No.: 11/641,920

(22) Filed: Dec. 19, 2006

(65) Prior Publication Data

US 2007/0146604 A1 Jun. 28, 2007

(30) Foreign Application Priority Data

Dec. 23, 2005 (TW) ................ 94146321 A

(51) Int. Cl.
*G02F 1/1343* (2006.01)
(52) U.S. Cl. ............... 349/141; 349/56; 349/84; 349/139
(58) Field of Classification Search .............. 349/56, 349/84, 139, 141
See application file for complete search history.

(56) References Cited

U.S. PATENT DOCUMENTS

| 6,417,907 | B2 | 7/2002 | Choi et al. | |
|---|---|---|---|---|
| 6,437,845 | B1 * | 8/2002 | Yamada et al. | 349/129 |
| 2004/0183979 | A1 | 9/2004 | Chen et al. | |
| 2004/0183980 | A1 * | 9/2004 | Chen et al. | 349/141 |
| 2005/0134777 | A1 | 6/2005 | Lee et al. | |

FOREIGN PATENT DOCUMENTS

| CN | 1532593 A | 9/2004 |
|---|---|---|
| CN | 1532605 A | 9/2004 |
| JP | 2001-154166 A | 6/2001 |
| TW | 200419239 A | 4/2004 |

* cited by examiner

*Primary Examiner*—Jennifer Doan
(74) *Attorney, Agent, or Firm*—Wei Te Chung

(57) ABSTRACT

An in plane switching liquid crystal display (IPS LCD) (100) has two substrates (110, 120) opposite to each other and spaced apart a predetermined distance; a liquid crystal layer (130) between the two substrates, and having a plurality of liquid crystal molecules; and an electrode array (111) formed on one of the substrate. Only one alignment layer (112) is provided, adjacent to the liquid crystal layer, which is formed on the substrate having the electrode array.

14 Claims, 1 Drawing Sheet

IN PLANE SWITCHING LCD AND FRINGE FIELD SWITCHING LCD

BACKGROUND OF THE INVENTION

1. Field of the Invention

The present invention relates to liquid crystal displays (LCDs), and particularly to an LCD providing a high transmittance ratio and high response speed of liquid crystal molecules therein.

2. Prior Art

In general, an LCD has two main advantages in comparison with cathode ray tubes (CRTs): LCDs are thin and have low power consumption. It has been said that LCDs might one day completely replace CRT display devices, and LCDs have aroused great interest in many industries in recent times.

However, LCDs generally provide a narrower viewing angle compared with CRT display devices. Various means have been devised in endeavoring to widen the viewing angle of LCDs.

One recently popular of such means is in-plane switching (IPS) mode or fringe field switching (FFS) mode. An LCD using IPS mode is based on a principle different from principles involved in other modes such as Twisted Nematic (TN) mode and Super Twisted Nematic (STN) mode. LCDs using these other modes are hereinafter collectively referred to as "usual" LCDs.

In a usual LCD, an electric field is generated perpendicular to a principal surface of a substrate. When the electric field is selectively and locally applied on a liquid crystal layer, liquid crystal molecules in the liquid crystal layer are uniformly oriented perpendicular to the principal surface. Coexistence of these aligned liquid crystal molecules with unaligned liquid crystal molecules provides the visual contrast between black and white on the usual LCD.

On the other hand, the IPS LCD or the FFS LCD provides said contrast by horizontally and locally applying an electric field parallel to a principal surface. That is, the liquid crystal molecules of the liquid crystal layer are locally aligned or oriented along the parallel electric field. Specifically, each liquid crystal molecule, which can be represented by an oval shape, is rotated in a plane due to the parallel field. This results in rotation of an orientation vector of each liquid crystal molecule defined by a long axis of the liquid crystal molecule. The orientation vectors of the liquid crystal molecules are termed directors. The IPS LCD or the FFS LCD can decrease dependency of the viewing angle compared with the usual LCD. Specifically, dependency of the viewing angle is a function of the relationship between the viewing angle and the contrast.

An typical IPS LCD is shown in FIG. 2, the IPS LCD 1 has a first transparent substrate 10, a second transparent substrate 20 opposite to the first transparent substrate 10, a liquid crystal layer 30 sandwiched between the first and the second substrates 10, 20. An electrode array 11 and a first alignment layer 12 are sequentially provided on the first substrate 10 in that order, from bottom to top. The electrode array 11 generally has a common electrode (not shown) and a pixel electrode (not shown), parallel to each other, which are used to produce a electrical field parallel to the two substrates 10, 20. A color filter layer 21 and a second alignment layer 22 are sequentially provided on the second substrate 20 in that order, from top to bottom. The liquid crystal layer 30 has a plurality of liquid crystal molecules.

Generally, for aligning the liquid crystal molecules of the liquid crystal layer 30 in a predetermined direction, two layers of polyimide are respectively coated on the first and second substrates 10, 20; and then the two layers of polyimide are rubbed to respectively form the first and the second alignment layers 12, 22, which have a plurality of grooves thereon having a predetermined orientation direction. The orientation direction of the first alignment layer 12 generally is different from that of the second alignment layer 22. The cooperation of the first and the second alignment layer 12, 22 can realize the alignment of the liquid crystal molecules in the liquid crystal layer 30.

However, because the first and the second alignment layers 12, 22 provide a same anchor force to the adjacent liquid crystal molecules, and the electrical field adjacent to the second substrate 20 is less than the electrical field adjacent to the first substrate 10. Thus, the LCD 1 manufactured by the above mentioned method generally has a question that the liquid crystal molecules adjacent to the second alignment layer 22 don't twist along the electrical field direction or need a long response time to produce twist when voltage is provided on the TFT array 11.

An improved IPS LCD or FFS LCD overcoming the above-mentioned disadvantages is desired.

SUMMARY OF THE INVENTION

An in plane switching liquid crystal display (IPS LCD) has two substrates opposite to each other and spaced apart a predetermined distance; a liquid crystal layer between the two substrates, and having a plurality of liquid crystal molecules; and an electrode array formed on one of the substrate. Only one alignment layer is provided, adjacent to the liquid crystal layer, which is formed on the substrate having the electrode array.

An fringe field switching liquid crystal display (FFS LCD) has two substrates opposite to each other and spaced apart a predetermined distance; a liquid crystal layer between the two substrates, and having a plurality of liquid crystal molecules; and an electrode array formed on one of the substrate. Only one alignment layer is provided, adjacent to the liquid crystal layer, which is formed on the substrate having the electrode array.

Other objects, advantages and novel features of the invention will become more apparent from the following detailed description when taken in conjunction with the accompanying drawings.

DETAILED DESCRIPTION OF THE PREFERRED EMBODIMENT

Hereinafter, a preferred embodiment of the present invention will be explained in more detail with reference to the accompanying drawings.

Figure 1:
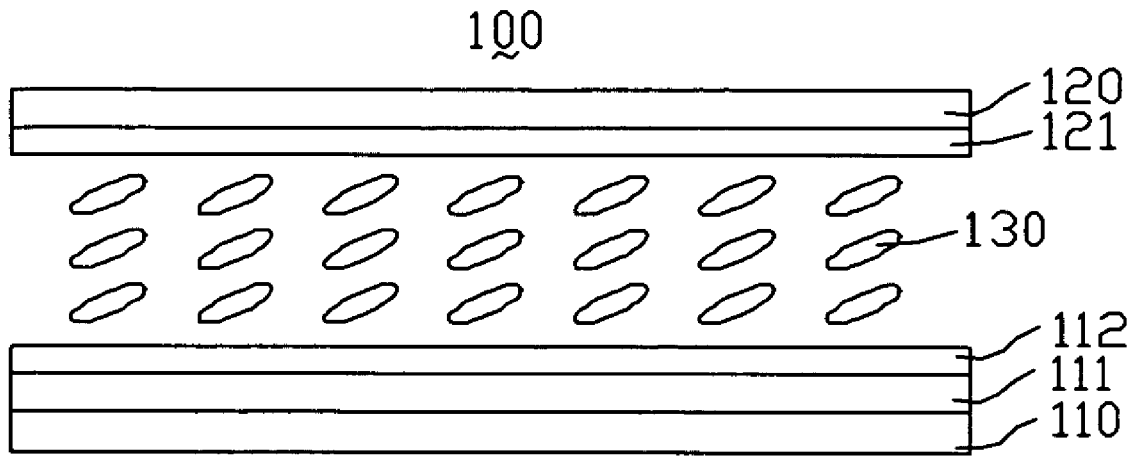
FIG. 1 is a schematic, cross-sectional view of an LCD in accordance with a first preferred embodiment of the present invention.
Figure 2:
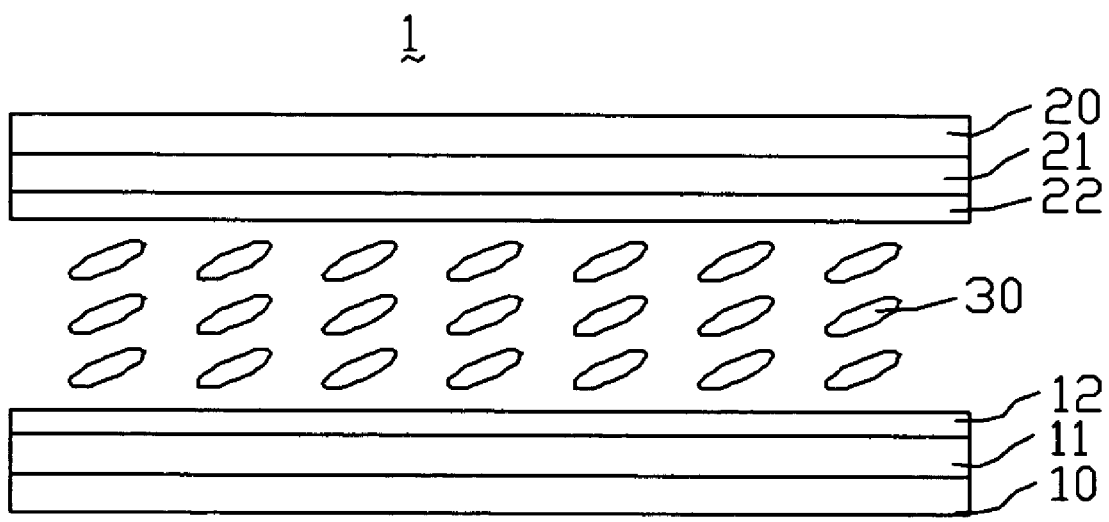
FIG. 2 is an schematic, cross-sectional view of a conventional LCD.

As shown in FIG. 1, an IPS LCD 100 according to the present invention has a first substrate 110, a second substrate 120 opposite to and spaced a predetermined distance from the first substrate 110, a liquid crystal layer 130 filled and installed between the first and the second substrates 110, 120, which has a plurality of liquid crystal molecules (not labeled).

The first and the second substrates 110, 120 respectively has a first principle surface (not labeled) facing the liquid crystal layer 130 and a second principle surface (not labeled) facing the liquid crystal layer 130. An electrode array 111 and an alignment layer 112 are sequentially disposed on the first principle surface of the first substrate 110 in that order, from bottom to top. A color filter layer 121 is provided on the second principle surface of the second substrate 120. The electrode array 111 has a plurality of pixel electrodes (not shown) and a plurality of common electrodes (not shown), parallel to each other, which are alternately disposed on the second substrate 110 to produce an electrical field substantially parallel to the second substrate 110.

In the IPS LCD 100, only one alignment layer 112 is provided on the first substrate 110, and no alignment layer is provided on the second substrate 120. The alignment layer 112 has a plurality of grooves extending along a predetermined direction orthogonal the direction of the electrical field. The anchor force provided on the liquid crystal molecules adjacent to the second substrate 120 is less than that provided on the liquid crystal molecules adjacent to the first substrate 110, and the electrical field provided on the liquid crystal molecules adjacent to the second substrate 120 is less than that provided on the liquid crystal molecules adjacent to the first substrate 110 too. Thus, the electrical field and the anchor force provided on the liquid crystal layer 130 match with each other over the whole liquid crystal layer 130 from the first substrate 110 to the second substrate 120. Thus, when voltage is provided on the electrode array 111, the liquid crystal molecules over the all liquid crystal layer 130 can fast twist along the electrical field. Therefore, the LCD 100 can attain a high response speed.

In an alternative embodiment, the structure, i.e. only one alignment layer is provided, also can be used in an FFS LCD. An electrode array can have a layer of common electrode covering the whole substrate, and a plurality of parallel pixel electrodes formed on the common electrode.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An in plane switching liquid crystal display (IPS LCD) comprising:
    two substrates opposite to each other and spaced apart a predetermined distance;
    a liquid crystal layer between the two substrates, and having a plurality of liquid crystal molecules; and
    an electrode array formed on one of the substrates;
    wherein only one alignment layer is provided, adjacent to the liquid crystal layer, being provided at the substrate having the electrode array, with the other substrate not having any alignment layer; wherein the alignment layer has a plurality of grooves extending along a predetermined direction and wherein the predetermined direction is orthogonal to the electrical field.

2. The IPS LCD of claim 1, wherein the grooves of the alignment layer have V-shaped profiles.

3. The IPS LCD of claim 1, wherein the electrode array has a plurality of common electrodes and a plurality of pixel electrodes, alternately formed on the substrate.

4. The IPS LCD of claim 3, wherein the alignment layer is set between the electrode array and the liquid crystal layer.

5. The IPS LCD of claim 1, further comprising a color filter layer formed on the other substrate, opposite to the electrode array.

6. A fringe field switching liquid crystal display (FFS LCD) comprising:
    two substrates opposite to each other and spaced apart a predetermined distance;
    a liquid crystal layer between the two substrates, and having a plurality of liquid crystal molecules; and
    an electrode array formed on one of the substrates;
    wherein only one alignment layer is provided, adjacent to the liquid crystal layer, being provided at the substrate having the electrode array, with the other substrate not having any alignment layer; wherein the alignment layer has a plurality of grooves extending along a predetermined direction and wherein the predetermined direction is orthogonal to the electrical field.

7. The FFS LCD of claim 6, wherein the grooves of the alignment layer have V-shaped profiles.

8. The FFS LCD of claim 6, wherein the electrode array has a common electrode layer covering the whole substrate, and a plurality of pixel electrodes formed on the common electrode layer, the pixel electrodes being parallel to each other.

9. The FFS LCD of claim 8, wherein the alignment layer is set between the electrode array and the liquid crystal layer.

10. The FFS LCD of claim 6, further comprising a color filter layer formed on the other substrate, opposite to the electrode array.

11. An in plane switching liquid crystal display (IPS LCD) comprising:
    two substrates opposite to each other and spaced apart a predetermined distance;
    a liquid crystal layer between the two substrates, and having a plurality of liquid crystal molecules; and
    a plurality of pixel electrodes formed on one of the substrates;
    wherein only one alignment layer is provided, adjacent to the liquid crystal layer, being provided at the substrate having the plurality of pixel electrodes, with the other substrate not having any alignment layer; wherein the alignment layer has a plurality of grooves extending along a predetermined direction and wherein the predetermined direction is orthogonal to the electrical field.

12. The IPS LCD of claim 11, wherein the grooves of the alignment layer have V-shaped profiles.

13. The IPS LCD of claim 11, wherein the alignment layer is set between the plurality of pixel electrodes and the liquid crystal layer.

14. The IPS LCD of claim 11, further comprising a color filter layer formed on the other substrate, opposite to the plurality of pixel electrodes.

* * * * *